June 9, 1936.   A. H. SIMPSON   2,043,308
PERFORATED CARD VERIFYING DEVICE
Filed May 23, 1929   6 Sheets-Sheet 1

WITNESS.
Dorie Irene Simpson

Inventor
Albert Henry Simpson.
By A. W. Maby
Attorney

June 9, 1936.  A. H. SIMPSON  2,043,308
PERFORATED CARD VERIFYING DEVICE
Filed May 23, 1929  6 Sheets-Sheet 2
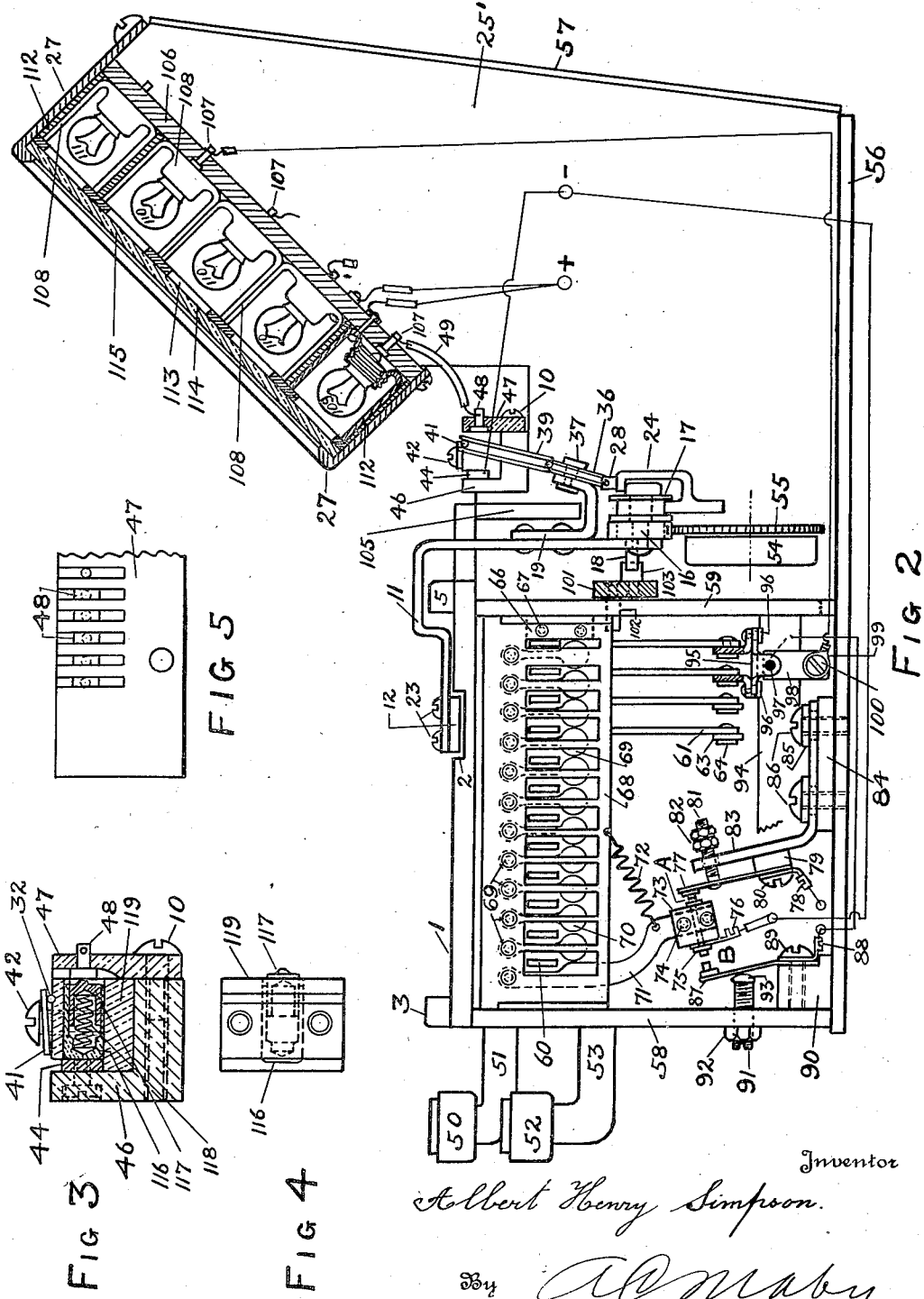
Inventor
Albert Henry Simpson.
By A. W. Maby
Attorney
WITNESS.
Dorie Irene Simpson

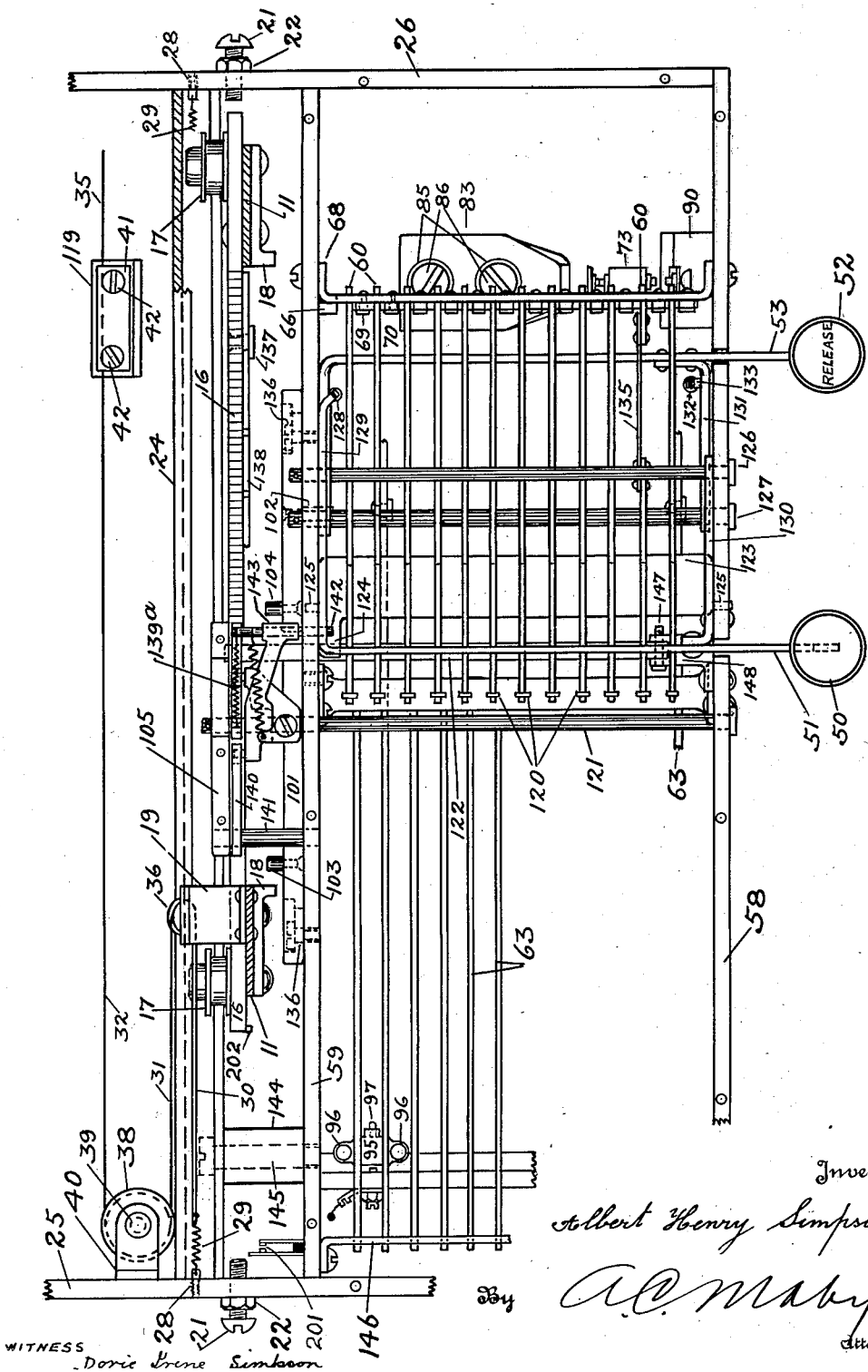

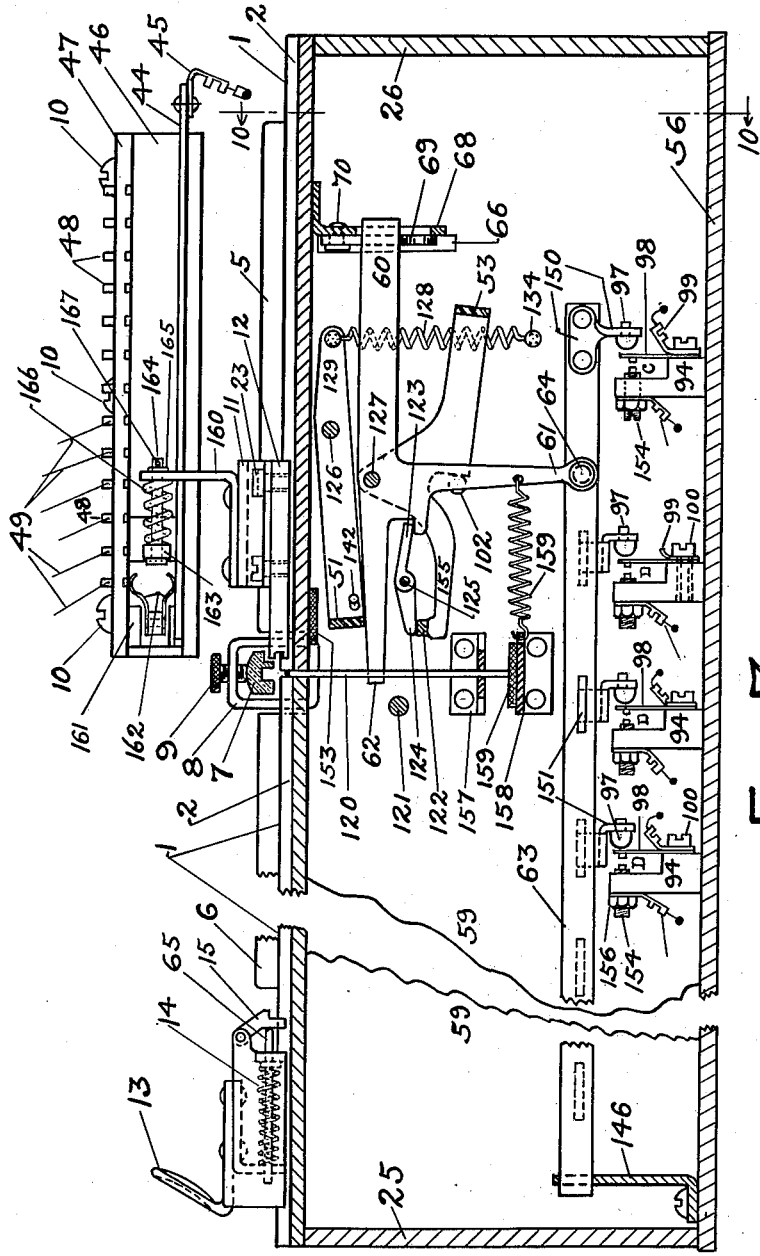

June 9, 1936. A. H. SIMPSON 2,043,308
PERFORATED CARD VERIFYING DEVICE
Filed May 23, 1929 6 Sheets-Sheet 6

WITNESS

Dorie Irene Simpson

Inventor
Albert Henry Simpson.

By A. C. Maby
Attorney

Patented June 9, 1936

2,043,308

UNITED STATES PATENT OFFICE 2,043,308

PERFORATED CARD VERIFYING DEVICE

Albert Henry Simpson, Washington, D. C., assignor, by mesne assignments, to International Business Machines Corporation, New York, N. Y., a corporation of New York Application May 23, 1929, Serial No. 365,511

4 Claims. (Cl. 73—51)

Heretofore machines called verifying machines were used by Hollerith and others, which machines were really dummy punches, trusting to two operators not to make the same error and in this way proving the accuracy of the card. My machine is designed to give an absolute sight reading showing precisely what is punched in the card.

An object of the invention is to provide a machine of this type with means whereby a card may be carried over plungers which analyze the perforations.

A further object of the invention is to provide a machine of the above type with means whereby a card may be moved on the carrier thereof for the purpose of registration and with spring tension means for forcing the cards lightly against the registration means.

A still further object of the invention is to provide a skip mechanism whereby the machine may skip from one column or group of columns to another, without depressing any key.

A still further object of the invention is to provide a machine which has only two operating keys.

A still further object of the invention is to provide a mechanism which insures the proper operation of the plungers when the holes in the last column on a card have been proof read.

A still further object of the invention is to provide a mechanism whereby one or two or more holes in a column may be read.

A still further object of the invention is to provide a mechanism which will work a double switch, making contact on one side for single holes, and the other side for two or more holes in column.

A still further object of the invention is to provide oscillating bars to work double hole contact switches.

A still further object of the invention is to provide a lamp indicator board suitably fitted with lamps and characters to suit the card being proof read.

A still further object of the invention is to provide a machine in which the whole of the card is visible all of the time.

A still further object of the invention is to provide a machine wherein the whole of the card is visible the whole of the time, and the column that is being operated upon, is magnified.

A still further object of the invention is to provide a column indicator for indicating the column being operated upon.

A still further object of the invention is to provide an indicator which shows on an indicator board the field on the card being operated upon.

A still further object of the invention is to provide a sliding indicator contact which is actuated by a moving portion of the machine, either in direct relationship or magnified relationship.

A still further object of the invention is to provide a cut-out switch to be operated as carriage and card reach the end of their travel to cut off all electric current to the machine, the same switch to automatically re-make contact when a new card is inserted and the carriage moved.

These and other objects will in part be obvious, and will in part be hereinafter more fully described in the drawings, which show by way of illustration, at least one complete embodiment of the invention, and show alternate methods of manufacture or application.

Changes and variations in the construction by which the invention is carried into effect may be made. The invention is not, therefore, to be confined to the particular construction hereinafter shown and described.

Referring to the drawings:

Fig. 2 is an end view with frame plate removed and portions shown in section for greater clearness;

Fig. 3 is a detail of the column indicator sliding contact and raceway;

Fig. 4 is a plan of the column indicator sliding contact;

Fig. 5 is a view of the contact side of the column indicator sliding raceway fixed contact plate;

Fig. 6 is a plan view of the machine with the card table and indicator board removed;

Fig. 7 is a front sectional elevation of the machine;

A card to be proof read or verified, is placed on the card table under a transparent plunger cover and between jaws of the carriage. The carriage and card are then pushed to the right end of machine. Then if there is a hole or holes in the first column the lamp under the corresponding character in the indicator board will light up and the precise numeral, letter or character can be read direct. Also the column which is being read is shown on the indicator board in the same manner. Then the ordinary key is depressed and this causes the carriage and card to move forward one column. Immediately the column number is shown and the corresponding value for the punched holes, if any, is shown on the indicator board, and this is repeated until all the columns are read. If there are no holes in a particular column only the column indicator lamp will light up. Should it be desired to skip any predetermined field or number of columns, a skip bar, which has been made to suit, is placed on the rack. Then proceed as before, and when the column to be skipped is presented the card and carriage will jump to the next column to be read, and the column number and the reading for that column will be shown. If it is desired to take a card that has been partly read out of the machine a skip bar may be fitted to suit or the release key may be depressed and the card and carriage will move to the end of their travel. A switch or contact points are provided to cut off all electric current as the carriage arrives at the left hand end of its travel and to automatically make contact again as the carriage is moved. This is only a safety switch in case operators forget to cut off the supply at the main switch.

Figure 8:
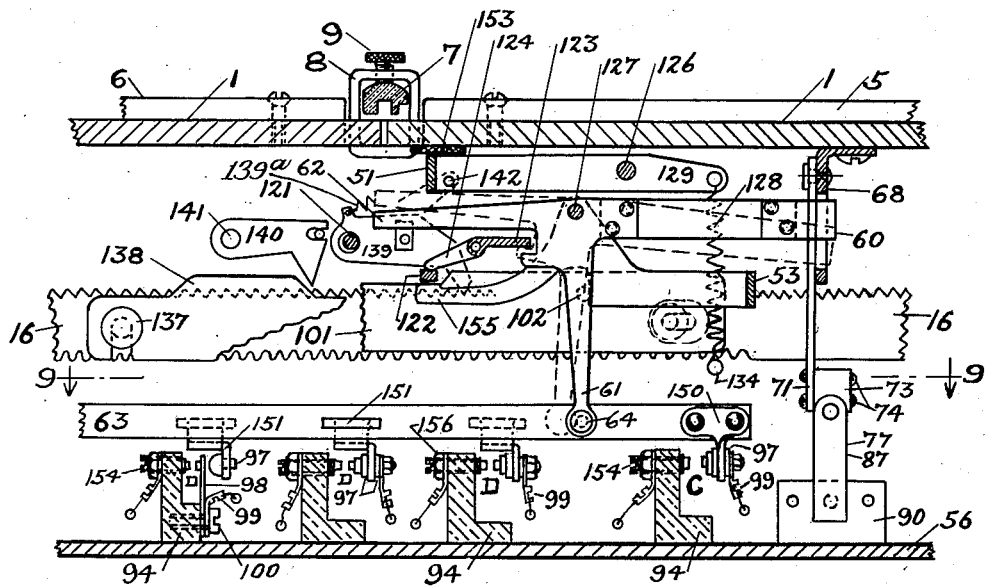
Fig. 8 is a broken front sectional elevation with rear frame and plate removed so as to show the carriage escapement mechanism.
Figure 9:
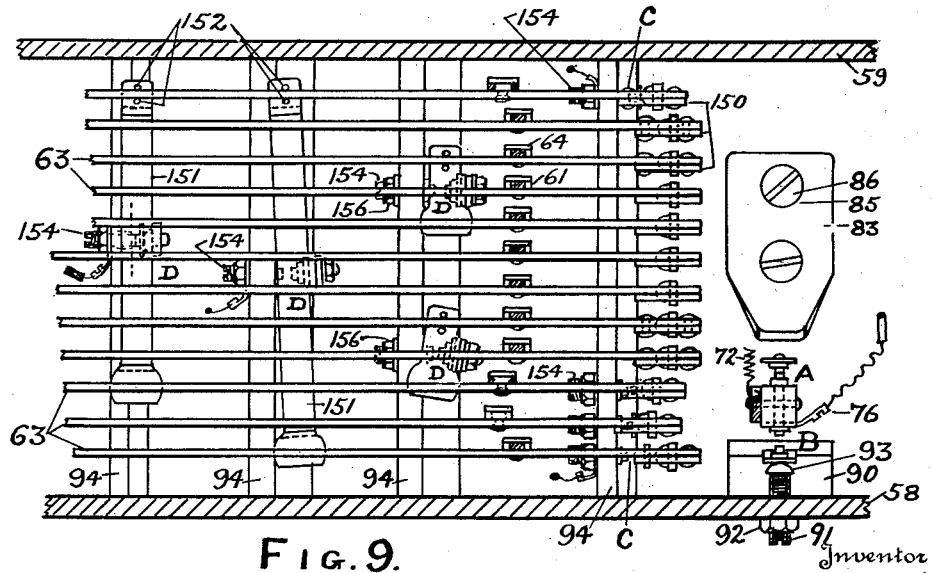
Fig. 9 is a sectional plan taken on line 9—9 of Fig. 8 showing lower portion with oscillating bars and bridges and single to double hole contact.
Figure 10:
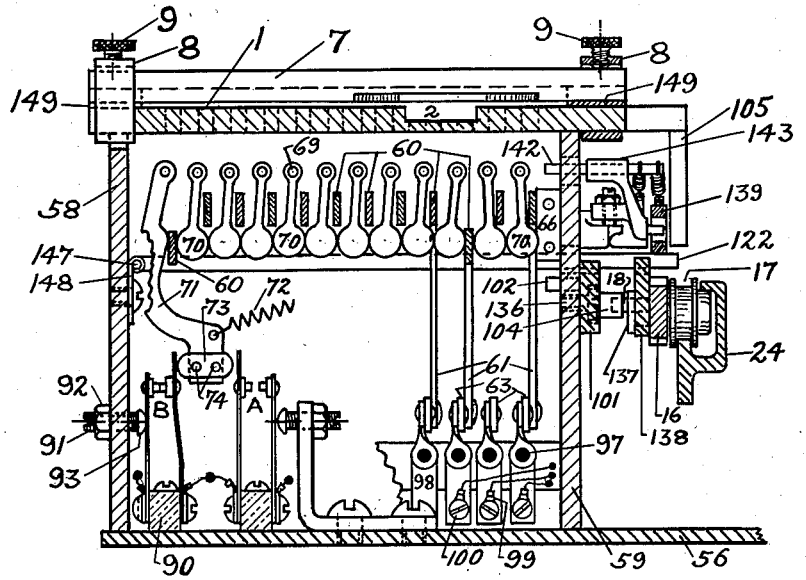
Fig. 10 is a broken sectional end view taken on line 10—10 of Fig. 7 showing single to double hole contact and contact operating links.
Figure 11:
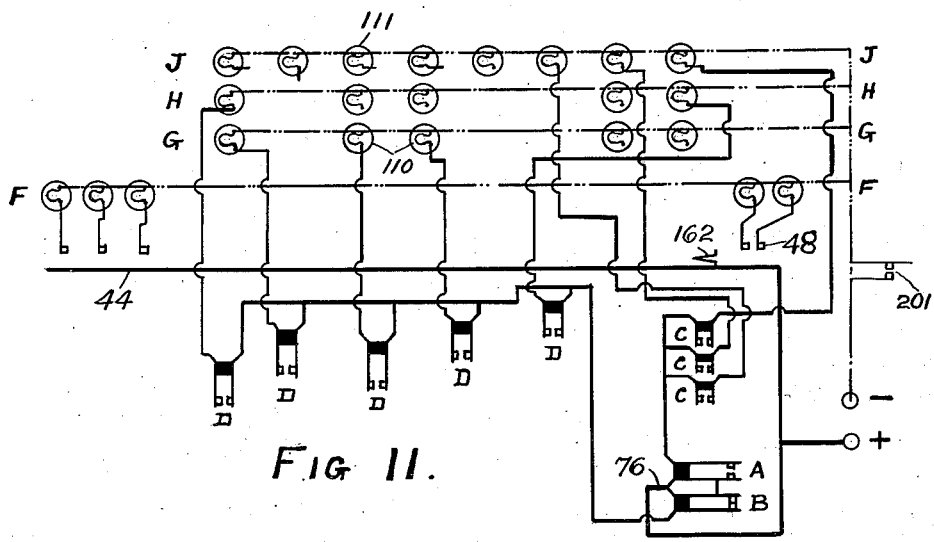
Fig. 11 is a wiring diagram.

A card to be verified or proof read is placed on the card table 1 underneath the transparent plunger cover 7 and between fixed jaws 12 and spring jaw 15 of the carriage. The carriage and card is then pushed from the left to the right end of the machine. This causes the contact blocks or pins 18 which are fixed to the rack to come against rack release plate pin 103 (Fig. 6) fixed to release plate 101, and so carries plate 101 with it causing the raised portion on plate 101 (Fig. 8) to move away from underneath the pawl lifter rod 122. This allows pawl 139 under action of its spring 139a to drop into engagement with rack 16. It also releases plate 123 which cooperates with all of the lever arms 61 so that springs 159 can rock said arms and cause the plungers 120 to come in contact with the card and if there is a hole there, to pass on through it. If a single hole is punched in a column only one plunger 120 will move up beyond the plane of the card under the influence of T lever 60, 61, 62, and its spring 159. The moving up of part of the plunger causes the end 60 of T lever pivoted at 127 to fall and end 61 to move oscillating bar 63 with it to the left, Fig. 7. This movement of a single oscillating bar 63 will cause the contact C to close. This will cause the current to go to the respective lamp 111 in line J (Fig. 11) to which that contact is connected. It will be noticed that the falling of the lever end 60 does not open or alter the single to double contact A (Fig. 10). The lamp 111 is placed in a receptacle 108 (Figs. 1 and 2) behind a number or letter or other visible indication, so that when the lamp lights, it will show which hole the plunger 120 has passed through. Then the key 50 is depressed.
The key is carried by bar 51 attached to arms 129, 130 pivoted at 126. Bar 51 reaches over all of arms 62 and is held up by spring 128. This depression of key 50 thus moves all the plungers 120 down to restored position and then through pin 142 cooperating with the arm 129 and connected to arm 143 of the escapement mechanism, permits the escapement to operate to cause the carriage 11 to move forward one space. As the key 50 is released, it again permits the plungers 120 to come into contact with the card, or pass through the holes in the card.

If there are two holes in the card in one column then two plungers will pass through the card and cause the ends of two levers 60 to fall. In falling they will swing the interlock members 70 and cause the single to double contact lever 71 to break the single hole contact A and make double hole contact B (see Figs. 2 and 10). At the same time the lower ends 61 of these levers cause the two oscillating bars 63 pivoted to them to move. This will close the contact D which may be carried by or operated by the bridge 151. Some bridges are attached at both of their ends to the bars 63. Each bar 63 has several of the bridges connected to it. The bridges that are connected to two bars have a contact D centrally located. If the two bars 63 connected to a bridge, move, the contact closes; if only one of the bars moves, the contact does not close. Some bridges are connected to only one bar 63 and if such bar moves, the corresponding contact closes. Then this contact D which has been made by the two bars 63 moving would carry its current to the lamp 110 to which that respective contact D is connected. Then by depressing the key 50 this withdraws all plungers 120 below the surface of the card and raises the end 60 of the T lever and so breaks the double contact B and makes single contact A again. When the card has been proof read to its last column, depression of either key 50 or 52 will lift the pawl 139 from the rack, the key 50 being connected through pin 142 to the escapement pawls as stated and key 52 being connected through arm 53 to arm 155 pivoted at 127 (see Figs. 6 and 8). Arm 155 will raise the bar 122 which in turn raises escapement pawl 139. When the carriage reaches the end of its travel to the left, it will cause pin or block 18 attached to rack 16 to engage pin 104 and carry the release plate 101 under the pawl lifter or rod 122. When the carriage reaches this position toward the left and causes rod 122 to be lifted, it causes plungers 120 to be depressed and leaves the machine free for loading and unloading.

*To release the card or carriage*

The release key 52 is carried by arms 53 and 131 pivoted at opposite ends on rod 127. Depression of this key causes the end 155 which is underneath the pawl lifter rod 122 to lift the rod 122 which at the same time lifts the pawl 139 out of the teeth of the rack and moves the arm 124 of the withdrawing plate 123 which moves the withdrawing plate 123 on its hinges 125 and this moves the T lever 60 which in turn withdraws the plungers 120 and permits the carriage 11 with the card to move the full length of its travel. Also, release key 52 through its arm 53 moves release plate 101 by pressing against pin 102 fixed on plate 101 and which projects through frame 59. This moves release plate 101 until its raised portion is under pawl lifter rod 122. It will be noticed that when release key 52 is released the pawl lifter rod 122 is still held up by the raised portion of release plate 101 and this therefore still holds the plungers 120 below the surface of the card table 1 which permits the card to be inserted. The card is guided by strips 3, 4, 5, and 6 fixed to card table 1. Over the card a plunger cover 7 is supported on packing pieces 149 and held down by clips 8 and clip screws 9 to projections formed on card table 1. The card table 1 is made in two parts for ease in making the holes for plungers 120. This is not necessary or desirable if circular plungers are used. In table 1 is a groove 2 for carriage jaws 12 and 15 to slide in. The card carriage consists of parts 11 to 19. The card carrier 11 has an adjustable plate 12 held in place by screws 23. At the other end of the carriage the card carrier 13 has a finger piece formed on or fixed to it and supports the positioning spring block 15 which presses the card against the end of adjusting plate 12 by the action of spring 14 and spring pin 65.

These card carriers are secured to rack 16 which rack has rollers 17 which run in raceway 24. Rack 16 also has trip pins or blocks 18 fixed to it to actuate the skip and release mechanism and two shoulder pins 137 fixed to it to carry skip bar 138. A carriage stop plate 20 having screw 21 and lock nut 22 is fixed at each end to limit travel of the carriage. The contact switch 201 is arranged to be opened by projection 202 (Fig. 6) on rack 16 just before the carriage arrives at the end of its travel to the left and is stopped by screw 21. This switch is between the source of electric supply and the machine.

*Skip arrangement*

To skip any column or number of columns if it is found necessary to do so is accomplished by placing a bar 138 (Figs. 6 and 8) on two shoulder studs 137. The bar of course could be screwed or fixed in any other manner. The normal height of the bar 138 when in position is just under the low position of the pawl lifter rod 122. Then a raised portion is formed on the bar of a sufficient height to raise the lifter rod 122 sufficiently to lift the pawl 139 out of the rack and the raising of rod 122 also moves withdrawing plate 123 through lever end 124 and through T lever 60 depressing plungers 120 as previously explained. As this raised portion passes it will automatically allow the lifter rod 122 to fall and the pawl to engage in the rack 16 again at the correct position and will allow the plungers 120 to come in contact with the card again or pass through the holes in it if there are any in that column.

The column indicator mechanism is suitable for any machine which has a travelling carriage or super-structure as a typewriter, gang punch or card punch. The two different types which are shown are suitable for cards with columns spaced relatively far apart, say approximately ¼" or over and the other for cards with columns spaced relatively close as for instance about ⅛" or less. The one with the columns spaced about ¼" has the column indicator sliding contact parts 161, 162, 163, and 164 (Fig. 7) flexibly or rigidly attached to the card carriage parts 11 to 19 direct, so that, as the carriage moves one space, sliding spring contact parts 161 to 164 move a similar distance. The other type of column indicator is arranged to give to the sliding spring contact parts 41 to 43 (Figs. 1 and 6), twice the movement of the carriage and card. This is done by having a cord 30 to 35 flexibly or rigidly attached to pins 28, fixed at each end of the machine to the frame or a stationary portion 25, 26. Starting from pin 28 at the left end of the machine, the cord 30, connected to the pin through spring 29 passes around a pulley wheel 36 pivoted at 37 on bracket 19 carried by the card carriage 11. The cord, here designated 31 then runs to a pulley 38 pivoted at 39 to a bracket 40 on the frame 25; the cord now designated 32 then passes under the clamp 41 of the sliding contact (see also Fig. 3) and is secured to the sliding contact. The cord, here designated 35 then passes around a pulley 38' pivoted at 39' to a bracket 40' fixed on frame 26. The cord then passes around pulley 36 on the card carriage. From here the cord designated 33 passes to spring 29' through which it is connected to pin 28' on frame 26.

Figure 1:
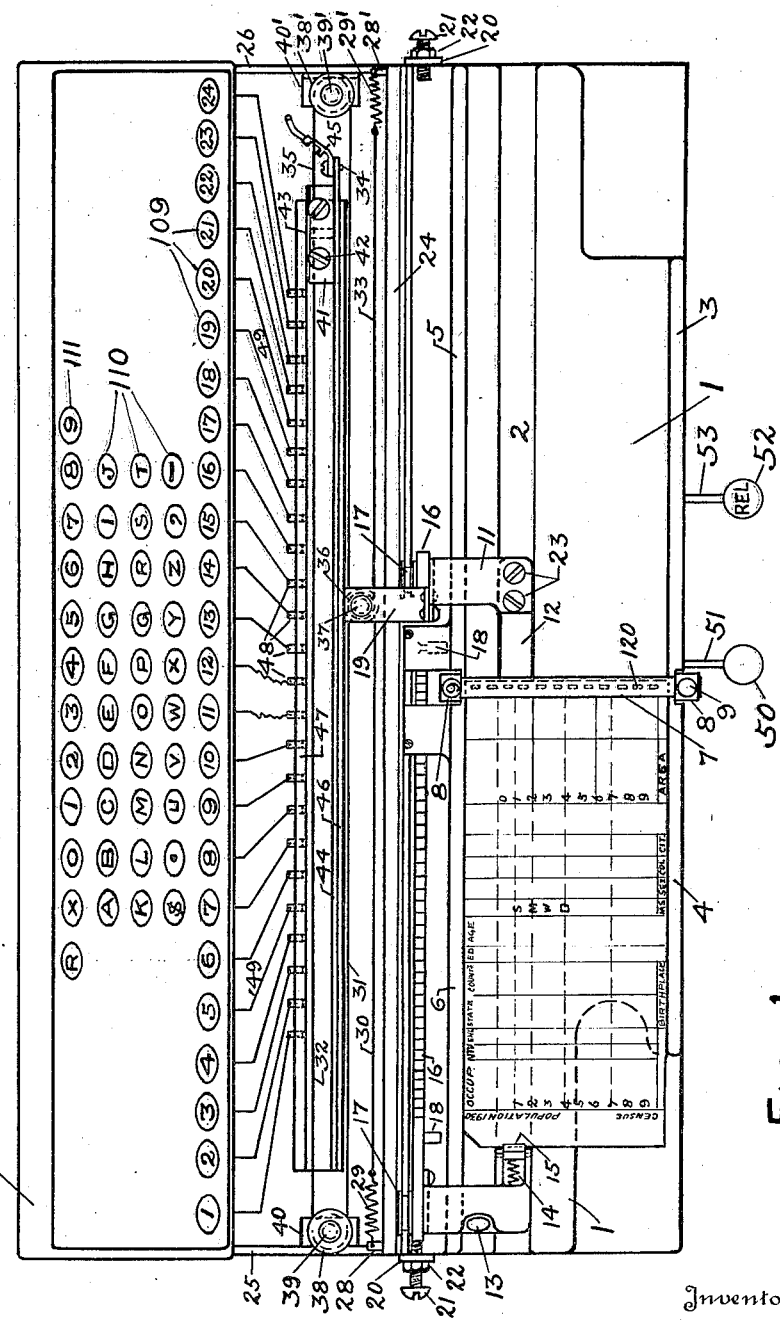
Fig. 1 is a plan of the machine.

It will be seen then that this sliding contact can be secured to the cord at any point for adjustment and as the carriage and card move one column the sliding contact will move twice the distance thus allowing a greater space between the fixed contact connections 48 that connect to the wires 49 which go to the lamps with less liability to short circuit or inaccurate connections. The sliding contact (Fig. 3) is made with an insulating material body 119 and a spring contact with two metallic pieces held against contact bar 44 and contacts 48 or one piece of spring material bent to form contact with contact bar 44 and contacts 48 and secured to a block fixed to sliding contact body 119. The raceway of the sliding contact is made of insulating material and on one side has contact bar 44 secured to it. This contact bar is connected to the source of electric supply by wire connector 45 (Figs. 1 and 7). The other side is made of an insulating plate 47 carrying contacts 48. The plate 47 clamps the sliding contact loosely in position. From the contact pieces 48 the wires 49 are connected to the lamps 109 through lamp contact 107 (Fig. 2). The lamps (Fig. 1) are shown reading from left to right but they can be placed in any position or grouped to suit individual taste and the wires 49 carried to them anywhere.

The indicator board although shown with all the lamps in it may be divided into sections and the lamps placed anywhere. For example:—it may be convenient to have the column lamps in a row at the front of machine near the operator and underneath the operating keys. The indicator board (Fig. 2) consists of an insulating base 106 which is carried in extensions 25' of side frames 25 and 26. This base 106 has lamp holders 108 and lamp contacts 107 secured to it.

All the lamp holders are connected together and then connected to the source of electric supply or insulation 112 is placed between the various groups of lamp holders 108 and each group wired to the source of electric supply. Over these lamp holders 108 an insulating sheet 113 is placed having holes cut in it to allow light to pass through. On this insulation a sheet of transparent material having the figures and numbers or ciphers on it in such a manner as to show clearly when a lamp underneath is lighted or a piece of material with letters, numbers or ciphers cut through it, similar to a stencil. Over this cipher key card 114 a glass or other transparent material sheet 115 is placed and all held securely with cover frame 27. As an alternative, a glass plate having the ciphers formed in or on it, and the other part frosted or made non-transparent and placed directly on lamp holders 108 and held down with frame 27.

Referring to the wiring diagram (Fig. 11) the supply of electric current is brought to the machine at the positive and negative terminals. Condensers may be placed on any circuit to eliminate sparking at contact points or other well known devices may be employed for this purpose.

Column indicator circuit

From the positive terminal the wire is taken to the contact bar 44 along which sliding contact makes connection with any one of the contacts 48 connected to the lamps on line F—F. These are the column indicator lamps and the return connection from them goes direct to negative terminal of the electric supply. The sliding contact is operated by the carriage or other moving portion of the machine.

Numeral or single hole circuit

From the positive terminal a wire is taken to the centre portion 76 of the single to double contact switch A. B. The contact A is normally maintained by the machine when there is only one hole in a column in card. From contact A a wire is carried to one side of all contacts C. The contacts C are made by the particular sliding bar 63 being selected by the one hole in the card in the column being analyzed. From contacts C a wire is carried to any lamp 111 in row J—J, and to the negative terminal of course of supply of electric current.

Alphabetical or double hole circuit

From the positive terminal a wire is carried to centre portion 76 of single to double contact switch A. B. (This is the same wire as for a single hole.) The contact A is broken and contact B is made when there are two holes in the card in one column. From contact B a wire is carried to one side of all the contacts D. The contact D is mechanically made by the machine when there are two holes in one column, and the particular contact D according to which two holes they are. From contacts D a wire is carried to the respective lamps 110 in rows H—H and G—G and from these lamps direct to negative terminal. In operation, when a contact D is closed one or more contacts C also close, but as the current to contacts C is broken by contact A the closing of these contacts C does not interfere with the proper operation of the machine.

While I have shown my invention as applied to a perforated card verifying device, I wish to have it understood that the invention is also applicable to card controlled machines, such as, tabulating machines, sorting machines and perforating machines.

In adapting the invention to a tabulating machine the card analyzing devices and the circuit contacts controlled thereby may be employed to control a relay or magnet in the place of the signal lamps 110, 111 disclosed here. Such magnets or relays may then control the operation of the tabulating machine.

In a sorting machine the card analyzing devices may again be employed to control the circuit contacts here disclosed to in turn control a relay in the place of the signal lamps 110, 111 and the relays then employed to control the distribution of the cards in the various sorting pockets.

In the present disclosure where the invention is applied to a card verifier it is, of course, desirable to feed the card step by step in conjunction with the visual verification of each column on the card. That is, as each column is operated upon the operator observes the signal lamps to ascertain what information the column contains so as to verify this with records showing what the column should contain. In this system it is therefore preferable that the card shall not move from one column to the next until after the operator has made his observations. He then depresses a key to cause the card to feed to the next column. In tabulating or sorting or perforating machines the cards may be fed automatically. Automatic card feeding devices are, of course, well known.

In a sorting machine where one column on a card is being analyzed the feeding mechanism may be adapted to feed the card to the machine with the proper column in position for operation after which the card may be fed out under control of the sorting mechanisms.

In a punching machine the card may be automatically fed step by step so as to present each successive column that is being reproduced to the perforation sensing devices.

In a tabulating machine the card may be fed step by step so as to present the successive columns in position to be analyzed, or analyzing devices for a plurality of columns may be employed so that a group of columns or the entire card may be analyzed in one operation.

I claim:

1. In a perforated record verifying machine, a row of sensing pins for sensing the index point positions of a record card column, there being one pin for each index point position, means to cause a record card to pass said row of pins column by column, a plurality of numerical signals, one for each pin, a plurality of alphabetic signals, one for each letter of the alphabet, means for concurrently moving said pins into engagement with each card column as it is presented, means operative when any single pin enters a perforation for causing operation of the associated numerical signal and means operative upon the concurrent entry of a plurality of pins into a plurality of perforations for suppressing the operation of said numerical signal and causing the operation of one of said plurality of alphabetic signals.

2. In a perforated record verifying machine, a plurality of sensing pins for sensing the index point positions of a record card column, there being one pin for each index point position, a plurality of numeral indicators, one for each pin, a plurality of alphabetic indicators, one for each letter of the alphabet, means for concurrently moving said pins into engagement with said card column, an operating circuit for each numeral indicator, means operative when any single pin enters a perforation for causing completion of one of said circuits to operate the associated numeral signal and means operative upon the concurrent entry of a plurality of pins into a plurality of perforations for preventing completion of said circuit and causing the operation of one of said plurality of alphabetic indicators.

3. In a perforated record verifying machine, a plurality of sensing pins for sensing the index point positions of a record card column, there being one pin for each index point position, a group of numeral indicators operable to indicate the presence of a single hole in the column sensed, a group of alphabetic indicators, operable to indicate the presence of multiple holes in the column sensed, means for concurrently moving said pins into engagement with said card column, means normally effective upon any individual pin entering a perforation for selecting and causing operation of one of said numeral group of indicators and means operative when more than one pin concurrently sense multiple perforations for suppressing the selection and operation of said numeral group and causing the selection and operation of one of said group of alphabetic indicators.

4. In a perforated record verifying machine, a plurality of sensing pins for sensing the index point positions of a record card column, there being one pin for each index point position, two groups of indicators, two pairs of contacts, a common operating member therefor, means for concurrently moving said pins against a card column, means operative when only a single pin senses a perforation for moving said member to close one of said pairs of contacts and operative when a plurality of pins sense perforations for moving said member to close the other of said pairs of contacts, an operating circuit for each of said groups of indicators and means operated by the pins and controlled by said pairs of contacts for completing the circuit of one of said groups when a single hole is sensed and for completing the circuit of the other group when multiple holes are concurrently sensed.

ALBERT H. SIMPSON.